(12) United States Patent
Morgenstern et al.

(10) Patent No.: US 8,708,638 B2
(45) Date of Patent: Apr. 29, 2014

(54) APPARATUS AND METHOD FOR ACTIVE GAP MONITORING FOR A CONTINUOUS FLOW MACHINE

(75) Inventors: Stefan Morgenstern, Munich (DE); Rudolf Stanka, Rattenkirchen (DE)

(73) Assignee: MTU Aero Engines GmbH, Munich (DE)

( * ) Notice: Subject to any disclaimer, the term of this patent is extended or adjusted under 35 U.S.C. 154(b) by 1082 days.

(21) Appl. No.: 11/997,106

(22) PCT Filed: Jul. 19, 2006

(86) PCT No.: PCT/DE2006/001245
§ 371 (c)(1),
(2), (4) Date: Jan. 28, 2008

(87) PCT Pub. No.: WO2007/012305
PCT Pub. Date: Feb. 1, 2007

(65) Prior Publication Data
US 2008/0166221 A1 Jul. 10, 2008

(30) Foreign Application Priority Data

Jul. 29, 2005 (DE) .......................... 10 2005 035 540

(51) Int. Cl.
*F01D 11/24* (2006.01)
(52) U.S. Cl.
USPC ............................................ 415/1; 415/174.2
(58) Field of Classification Search
CPC ....................................................... F01D 11/24
USPC ................................ 415/108, 177, 178, 173.2
See application file for complete search history.

(56) References Cited

U.S. PATENT DOCUMENTS

| | | | |
|---|---|---|---|
| 5,100,291 A | | 3/1992 | Glover |
| 5,205,115 A | * | 4/1993 | Plemmons et al. ......... 415/173.1 |
| 5,385,013 A | * | 1/1995 | Barron et al. ................. 415/116 |
| 5,399,066 A | | 3/1995 | Ritchie et al. |
| 5,738,488 A | * | 4/1998 | Gazzillo et al. ............... 415/112 |
| 5,980,201 A | | 11/1999 | Benoist et al. |
| 6,149,074 A | * | 11/2000 | Friedel et al. ................. 415/175 |
| 2002/0136631 A1 | | 9/2002 | Zearbaugh et al. |

FOREIGN PATENT DOCUMENTS

| | | |
|---|---|---|
| EP | 0 541 325 A1 | 5/1993 |
| GB | 2 217 788 | 11/1989 |
| JP | 2001115803 A  * | 4/2001 |

OTHER PUBLICATIONS

JP 2001-115803 A Machine Translation. Acessed JPO website Dec. 20, 2012. 3 pages.*
Helmut Kuehnelt, "Simulating the sound generation in flutes and flue pipes with the Lattice-Boltzmann-Method", Proceedings of the International Symposium on Musical Acoustics, Mar. 31-Apr. 3, 2004, pp. 251-254, ISMA2004, Nara, Japan.

* cited by examiner

*Primary Examiner* — Richard Edgar
(74) *Attorney, Agent, or Firm* — Crowell & Moring LLP

(57) ABSTRACT

An apparatus and method for active gap monitoring for a continuous flow machine, in particular an aircraft propulsion device, which has a rotor and a housing which surrounds the rotor forming a rotor gap, is disclosed. The apparatus having a cooling channel which is arranged on the external circumference of the rotor housing and is supplied with cooling air from a plenum. The cross section of the cooling channel decreases from the plenum in the circumferential direction. This ensures homogenous cooling and reduces the weight of the apparatus.

22 Claims, 1 Drawing Sheet

APPARATUS AND METHOD FOR ACTIVE GAP MONITORING FOR A CONTINUOUS FLOW MACHINE

BACKGROUND AND SUMMARY OF THE INVENTION

This application claims the priority of International Application No. PCT/DE2006/001245, filed Jul. 19, 2006, and German Patent Document No. 10 2005 035 540.4, filed Jul. 29, 2005, the disclosures of which are expressly incorporated by reference herein.

The invention relates to an apparatus and method for active gap monitoring for a continuous flow machine, in particular an aircraft propulsion device, which has a rotor and a housing which surrounds the rotor forming a rotor gap, with the apparatus having a cooling channel which is arranged on the external circumference of the rotor housing and is supplied with cooling air from a plenum.

In the case of continuous flow machines, which include, e.g., turbines, pumps, compressors or ventilators, the rotor gap between the stationary rotor housing and the rotating rotor represents a source of flow losses and therefore a cause of a decreased degree of efficiency. The flow losses are generated firstly by the formation of turbulence and flow separation in or at the rotor gap, which also produces an increase in flow noise, and secondly, by a compensating flow, which is directed against the main flow direction by the rotor and limits the achievable pressure differential between the high pressure side and the low pressure side of the continuous flow machine.

In an ideal continuous flow machine that is free of losses, there would be no rotor gap. This is not possible in practice, however, since in this case the tips of the rotor blades would make contact with the housing and rub against the housing when the rotor is rotating and wear down as a result. This problem is particularly pronounced in continuous flow machines whose rotors rotate at high speeds and/or are subject to high temperatures, such as is the case with aircraft engines and gas turbines as well as exhaust-driven turbochargers. In the case of these types of continuous flow machines, the rotor blade elongates as a function of the temperature and the speed. In addition, the housing expands as a function of the operating temperature. The expansion of the housing and the elongation of the rotor blades are compensated for by the rotor gap, without it being possible for the continuous flow machine to be damaged.

The width of the rotor gap and thus the losses of the continuous flow machine change accordingly as a function of the speed and temperature in the operating state that has just been passed through.

In practice, the rotor gap is adjusted as a rule so that there is the smallest possible rotor gap at a continuous operation point at which the continuous flow machine is normally operated. In the case of aircraft engines or exhaust-driven turbochargers, this continuous operating point lies at the travel speed for example. At the same time, when dimensioning the rotor gap, critical load ranges and starting ranges of the continuous flow machine are taken into account in practice: The rotor gap should be dimensioned in such a way that even under extreme conditions damage to the rotor blade and housing are avoided with acceptable flow losses.

Thus in practice a certain amount of wear to the housing and rotor blade from starting the continuous flow machine or operating it in the critical load range is accepted in exchange for the best possible degree of efficiency.

Several solutions are proposed in the prior art in order to achieve an optimal rotor gap in all operating ranges of the continuous flow machine, i.e., a rotor gap width at which wear and flow losses are minimal.

Thus, U.S. Pat. Nos. 6,149,074, 5,100,291, and 5,399,066 and U.S. Patent Application Publication 2002/0136631 A1 describe apparatuses for active gap monitoring (active clearance control ACC) in gas turbines, which are comprised of cooling channels arranged on the housing circumference. As a result of this, parts of the housing are selectively cooled with respect to the rotor in order to adjust the rotor gap via the thermal expansion of the housing that is controlled in this manner.

The disadvantage of this known prior art is that these cooling channels are designed with constant cross sections. This produces increased weight and cooling that is not homogeneous.

The invention is therefore based on the objective of improving the apparatuses for active gap monitoring that were mentioned at the outset. In particular, the weight of these types of apparatuses is supposed to be reduced and homogenous cooling is supposed to be ensured.

The inventive apparatus for active gap monitoring for a continuous flow machine, in particular an aircraft propulsion device, which has a rotor and a housing which surrounds the rotor forming a rotor gap, with the apparatus having a cooling channel which is arranged on the external circumference of the rotor housing and is supplied with cooling air from a plenum, is characterized in that the cross section of the cooling channel decreases from the plenum in the circumferential direction. Thus, the cross section can be adjusted so that the flow speed along the circumference remains the same and therefore the opening distance can be kept constant.

This ensures homogenous cooling and reduces the weight of the apparatus.

An advantageous embodiment of the invention provides that the cooling channel has a rectangular cross section. This can be a square or generally rectangular cross section.

An advantageous embodiment of the invention provides that the cooling channel has a round cross section. This can be a circular or elliptical or otherwise round cross section.

An advantageous embodiment of the invention provides that the radial extension of the cross section of the cooling channel decreases in the circumferential direction. In this case, the axial extension of the cross section may remain constant.

An advantageous embodiment of the invention provides that the axial extension of the cross section of the cooling channel decreases in the circumferential direction. In this case, the radial extension of the cross section may remain constant.

An advantageous embodiment of the invention provides for several cooling channels to be arranged in succession. This allows the rotor gaps of several turbine stages arranged axially in succession to be regulated.

An advantageous embodiment of the invention provides for a cooling channel to encircle only a partial circumference of the housing. As a result, the cooling channel can be divided into two partial channels for example, each of which encircle half of the housing circumference.

Additional measures improving the invention are described in more detail in the following on the basis of the figures along with a description of a preferred exemplary embodiment of the invention.

DETAILED DESCRIPTION OF THE DRAWINGS

The following figures are schematic representations and serve to explain the invention. The same and similar components are represented by the same reference numbers. The directional indications refer to the continuous flow machine unless otherwise indicated.

Figure 1:
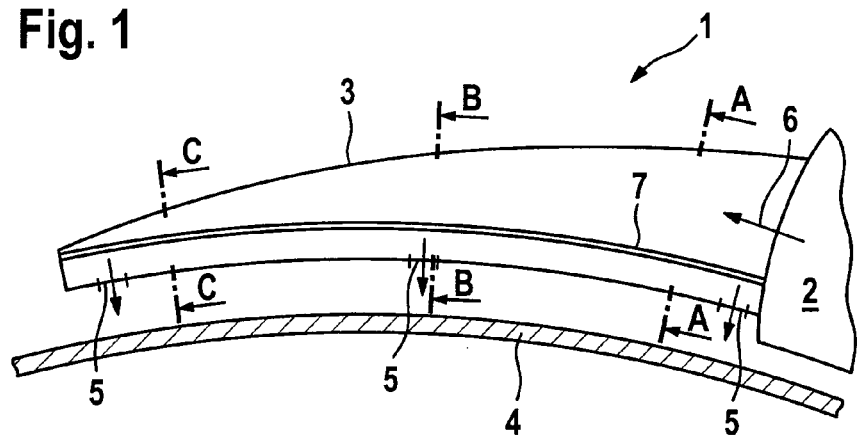
FIG. 1 is a schematic section through a portion of an inventive apparatus for active gap monitoring.

FIG. 1 shows a schematic section through a portion of an inventive apparatus for active gap monitoring 1. In this case, portions of a cooling channel 3 are depicted with a cross section that decreases over the circumference. The corresponding cross sections along Lines A-A, B-B and C-C are depicted schematically in FIG. 2a-c.

Figure 2:
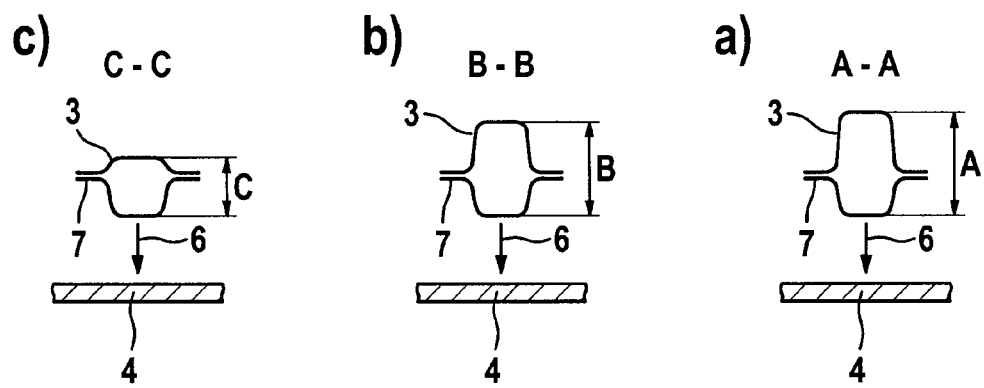
FIG. 2a-c are schematic cross sections along Lines A-A, B-B and C-C from FIG. 1.

As FIG. 2a-c show, the cross section of the cooling channel 3 is embodied essentially rectangularly. In this case, the height, i.e., the radial extension of the cross section, decreases in the circumferential direction, i.e., in FIG. 2a the radial extension of the cross section "A" is greater than the radial extension of the cross section "B" in FIG. 2b and this in turn is greater than the radial extension of the cross section "C" in FIG. 2c. The axial extension of the cross section in this case remains essentially the same.

The cooling channel in the present exemplary embodiment is produced by two plastically deformed metal halves, which are connected non-positively at a crosspiece 7, for example by means of welding. The cooling channel 3 is fastened to the housing 4 and in the present exemplary embodiment completely encircles the rotor housing 4 and cools it via outlet openings 5.

In operation, the cooling channel 3 is supplied with outlet air from the compressor, which flows into the cooling channel 3 via the plenum 2, as indicated by arrow 6. This counteracts the thermal expansion of the housing 4 and therefore the rotor gap arising between the rotor housing and the rotor blade tips.

Figure 3:
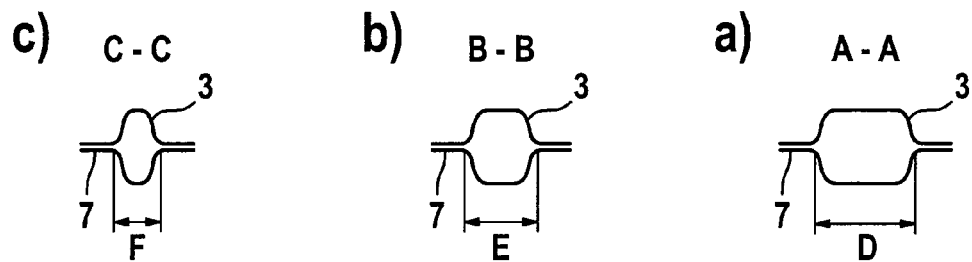
FIG. 3a-c are schematic cross sections of an alternative embodiment.

FIG. 3a-c schematically show cross sections of an alternative embodiment. In this case, the width, i.e., the axial extension of the cross section, decreases in the circumferential direction, i.e., in FIG. 3a the axial extension of the cross section "D" is greater than the axial extension of the cross section "E" in FIG. 3b and this in turn is greater than the axial extension of the cross section "F" in FIG. 3c. The radial extension of the cross section in this case remains essentially the same. The functionality of this embodiment corresponds to that described above.

Because of the cooling channel cross section that decreases over the circumference, the cooling air flow is standardized and rotor gap control is thereby improved. In addition, the weight of the component is also reduced because of the reduction in material.

The invention is not limited in terms of its design to the preferred exemplary embodiment disclosed in the foregoing. In fact, a number of variations are conceivable, which make use of the described attainment even with fundamentally other different designs.

The invention claimed is:

1. An apparatus for active gap monitoring for a continuous flow machine which has a rotor and a housing which surrounds the rotor forming a rotor gap, comprising a cooling channel, wherein the cooling channel is a structure of two deformed metal halves which are connected at a crosspiece and wherein the cooling channel structure is fastened to an external circumference of the housing, wherein the cooling channel is supplied with cooling air from a plenum, and wherein a cross section of the cooling channel decreases from the plenum in a flow direction of the cooling air through the cooling channel.

2. The apparatus for active gap monitoring for a continuous flow machine according to claim 1, wherein the cooling channel has a rectangular cross section.

3. The apparatus for active gap monitoring for a continuous flow machine according to claim 1, wherein the cooling channel has a round cross section.

4. The apparatus for active gap monitoring for a continuous flow machine according to claim 1, wherein a radial extension of the cross section of the cooling channel decreases in the flow direction.

5. The apparatus for active gap monitoring for a continuous flow machine according to claim 1, wherein an axial extension of the cross section of the cooling channel decreases in the flow direction.

6. The apparatus for active gap monitoring for a continuous flow machine according to claim 1, wherein several cooling channels are arranged in succession.

7. The apparatus for active gap monitoring for a continuous flow machine according to claim 1, wherein the cooling channel encircles only a partial circumference of the housing.

8. The apparatus for active gap monitoring for a continuous flow machine according to claim 1, wherein the continuous flow machine is an aircraft propulsion device.

9. The apparatus for active gap monitoring for a continuous flow machine according to claim 1, wherein the cross section of the cooling channel continuously decreases from the plenum in the flow direction.

10. A continuous flow machine, comprising:
a rotor;
a housing which surrounds the rotor, wherein the rotor and the housing define a rotor gap therebetween; and
a cooling channel, wherein the cooling channel is a structure of two deformed metal halves which are connected at a crosspiece and wherein the cooling channel structure is fastened to an external circumference of the housing, and wherein a cross section of the cooling channel decreases from a plenum in a flow direction of cooling air through the cooling channel.

11. The continuous flow machine according to claim 10, wherein the continuous flow machine is an aircraft propulsion device.

12. The continuous flow machine according to claim 10, wherein the cooling channel defines outlet openings disposed adjacent to the housing.

13. The continuous flow machine according to claim 10, wherein a radial extension of the cross section of the cooling channel decreases in the flow direction.

14. The continuous flow machine according to claim 10, wherein an axial extension of the cross section of the cooling channel decreases in the flow direction.

15. The continuous flow machine according to claim 10, wherein the cross section of the cooling channel continuously decreases from the plenum in the flow direction.

16. A method for controlling a gap between a rotor and a housing in a gas turbine engine, comprising the steps of:
flowing a cooling air through a cooling channel, wherein the cooling channel is a structure of two deformed metal halves which are connected at a crosspiece and wherein the cooling channel structure is fastened to an external circumference of the housing, and wherein a cross section of the cooling channel decreases from a plenum in a flow direction of the cooling air through the cooling channel;

cooling the housing by the cooling air; and controlling a length of the gap by the step of cooling the housing.

17. The method according to claim 16, wherein a flow speed of the cooling air remains constant within the cooling channel.

18. The method according to claim 17, wherein the length of the gap remains substantially constant.

19. The method according to claim 16, wherein the cooling channel defines outlet openings disposed adjacent to the housing.

20. The method according to claim 16, wherein a radial extension of the cross section of the cooling channel decreases in the flow direction.

21. The method according to claim 16, wherein an axial extension of the cross section of the cooling channel decreases in the flow direction.

22. The method according to claim 16, wherein the cross section of the cooling channel continuously decreases from the plenum in the flow direction.

\* \* \* \* \*